United States Patent [19]

Köhler et al.

[11] Patent Number: 5,545,692

[45] Date of Patent: Aug. 13, 1996

[54] POLYESTERS OF DIMER FATTY ACID AND DIMER FATTY DIOL AND THEIR USE FOR THE PRODUCTION OF POLYESTER CARBONATES

[75] Inventors: Burkhard Köhler; Heinz Pudleiner, both of Krefeld; Klaus Horn, Dormagen, all of Germany

[73] Assignee: Bayer Aktiengesellschaft, Leverkusen

[21] Appl. No.: 443,446

[22] Filed: May 18, 1995

[30] Foreign Application Priority Data

Jun. 1, 1994 [DE] Germany ............... 44 19 229.0

[51] Int. Cl.⁶ ............ C08G 63/18; C08G 63/16; C08G 63/64
[52] U.S. Cl. ............ 525/146; 525/439; 528/195; 528/295.3; 528/307
[58] Field of Search ............... 528/195, 295.3, 528/307; 525/146, 439

[56] References Cited

U.S. PATENT DOCUMENTS

| | | | |
|---|---|---|---|
| 3,091,600 | 5/1963 | Caldwell | 528/307 |
| 3,549,570 | 12/1970 | Coury . | |
| 4,169,868 | 10/1979 | Schreckenberg et al. | 525/439 |
| 5,101,009 | 3/1992 | Nakane | 528/307 |

OTHER PUBLICATIONS

Chemical Abstract Registry Number 83615–26–3.

*Primary Examiner*—David Buttner
*Attorney, Agent, or Firm*—Connolly & Hutz

[57] ABSTRACT

The invention relates to new polyesters of dimer fatty acid and dimer fatty diol each containing 36 or 44 carbon atoms, to their production, to their use for the production of polyester carbonates and to the new polyester carbonates.

7 Claims, No Drawings

POLYESTERS OF DIMER FATTY ACID AND DIMER FATTY DIOL AND THEIR USE FOR THE PRODUCTION OF POLYESTER CARBONATES

This invention relates to new polyesters of dimer fatty acid and dimer fatty diol, to their production, to their use for the production of polyester carbonates and to the new polyester carbonates.

Dimer fatty acid esters of typical diols are known. U.S. Pat. No. 3,549,570 describes the incorporation of special dimer fatty acid polyesters—obtainable by esterification of dimer fatty acid with diols and subsequent transesterification with aromatic polycarbonate in chlorobenzene solution in a two-stage reaction—in polycarbonate at the phase interface to form polyester carbonates.

DE-OS 2 636 783 (=U.S. Pat No. 4,169,868) describes the incorporation of acid-terminated polyesters of other diacids in polycarbonate at the phase interface to form polyester carbonates.

Tests have shown that acid-terminated polyesters of dimer fatty acid and typical diols cannot be incorporated in polycarbonate at the phase interface.

Accordingly, the problem addressed by the present invention was to produce new polyesters of dimer fatty acid, which could be incorporated in polycarbonate at the phase interface without further modification, in a single stage.

The present invention therefore relates to acid-terminated polyesters with an acid value of 2 to 70 and an OH value of <10, the maximum OH value being 30% of the acid value, obtainable from A) hydrogenated dimer fatty acids containing 36 or 44 carbon atoms and preferably 36 carbon atoms and B) dimer fatty diols containing 36 or 44 carbon atoms and preferably 36 carbon atoms.

Hydrogenated dimer fatty acids in the context of the present invention are acids obtainable by dimerization of octadecadienoic acids, optionally with addition of up to one equivalent of octadecadienoic acid, and subsequent hydrogenation or by dimerization of erucic acid ($C_{22}$) and subsequent hydrogenation.

Dimer fatty diols are obtainable by reduction of both carboxyl groups of the hydrogenated dimer fatty acids to primary alcohol groups.

In a preferred embodiment, the polyesters according to the invention substantially correspond to general formula (I):

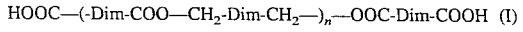

in which n is a natural number of 1 to 50 and preferably 1 to 10 and

Dim corresponds to formula (II) and/or (III) and/or (IV):

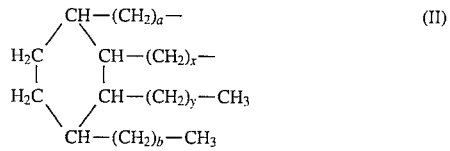

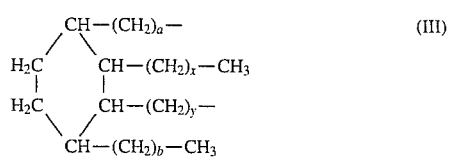

with a+b=12 and x+y=14, and

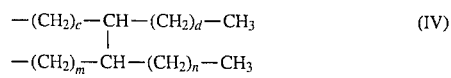

with c+d=19 and m+n=19.

The molecular weight of the polyesters is in the range from 1,700 to 28,000 and preferably in the range from 1,700 to 5,700 g/mole.

The polyesters are prepared by mixing the components, the reaction taking place in the presence or absence of transesterification catalysts, at temperatures in the range from 150° C. to 250° C. and preferably at temperatures in the range from 180° C. to 220° C. over a reaction time of 2 to 20 hours; low molecular weight substances are distilled off and a vacuum of 0.2 to 100 mbar preferably being applied for 0.5 to 6 hours at the end of the reaction. The hydrogenated dimer fatty acid (A) is generally used in a 1.02 to 2 fold molar excess over dimer fatty diol (B).

The present invention also relates to a process for the production of polyester carbonates from polyesters of the above-mentioned polyester units, diphenols, optionally chain terminators typically used in the synthesis of polycarbonates and optionally other branching agents than the polyester units by the known polycarbonate production methods using phosgene in homogeneous solution (so-called pyridine process) or in a two-phase system (so-called interfacial process), characterized in that the polyesters according to the invention are used as the polyester units in quantities, based on the total quantity of diphenols used, of 1% by weight to 70% by weight.

Preferred ratios by weight are 5 to 20% by weight of polyesters according to the invention, based on the total quantity of diphenols used.

The present invention also relates to the polyester carbonates obtainable by the process according to the invention which contain 1 to 70% by weight and preferably 5 to 20% by weight of polyesters, based on the total quantity of diphenols used.

The polyester carbonates according to the invention show improved thermal stability in relation to comparable known polyester carbonates (see, for example, DOS 2 726 417). In addition, the synthesis comprises only one stage because the polyester according to the invention can be directly used in the interfacial process.

Suitable diphenols are those typically used for the production of thermoplastic aromatic polycarbonates, i.e. for example dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropyl benzenes and nucleus-alkylated and nucleus-halogenated compounds thereof. These and other suitable aromatic dihydroxy compounds are described, for example, in U.S. Pat. Nos. 3,028,365, 2,999,835, 4,982,014, 3,148,172, 2,991,273, 3,271,367 and 2,999,846.

Preferred diphenols are, for example, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, α,α-bis-(4-hydroxyphenyl)-p-diisopropyl benzene, 2,2-bis-(3-chloro-4-hydroxyphenyl)propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-3,3,5-trimethyl cyclohexane and 2,2-bis-(3,5-dimethyl-4-hydroxyphenyl)-propane.

Particularly preferred diphenols are, for example, 2,2-bis-(3,5-dimethyl-4-hydroxyphenyl)-propane, 2,2-bis-(4-hydroxyphenyl) -propane, 2,2-bis- (3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxy)-3,3,5-trimethyl cyclohexane.

Mixtures of the diphenols mentioned above may also be used.

Suitable chain terminators typically used for the synthesis of polycarbonates are monofunctional compounds, such as monophenols, chlorocarbonic acid esters thereof or monocarboxylic acid chlorides. Examples are phenol, 2,6-dimethylphenol or p-tert.butylphenol, being used in quantities of 0.1 to 10 mole-% per mole of diphenol. The acid chlorides of monofunctional carboxylic acids or the chlorocarbonic acid esters of the monophenols may also be used.

Suitable other branching agents than the polyester units are other trifunctional or other more than trifunctional compounds, more particularly those containing three or more than three phenolic hydroxy groups which may be used in a quantity of, preferably, 0.05 to 2.0 mole-% (based on diphenols used).

Examples are phloroglucinol, 3,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-(4,4'-dihydroxydiphenyl)-cyclohexyl]-propane, 2,4-bis-(4-hydroxyphenylisopropyl)-phenol, 2,6-bis-(2'-hydroxy-5'-methyl-benzyl)- 4-methylphenol, 2,4-dihydroxybenzoic acid, 2-(4-hydroxyphenyl)- 2-(2,4-dihydroxyphenyl)-propane, 1,4-bis(4',4 "-dihydroxytriphenylmethyl)-benzene and 3,3-bis-(4-hydroxyphenyl)- 2-oxo-2,3-dihydroindole.

The production of the polyester carbonates according to the invention by the interfacial process is carried out by dissolving one of the above-mentioned diphenols or mixtures of the above-mentioned diphenols in an aqueous alkaline phase.

Similarly, the polyesters according to the invention are dissolved in a water-immiscible organic solvent and added. Phosgene is then introduced at a temperature of 0° C. to 80° C. and preferably at a temperature of 15° C. to 40° C. and at a pH value of 9 to 14. The polycondensation is carried out after phosgenation by addition of 0.2 to 5 mole-% of tertiary aliphatic amine, based on the moles of diphenol used. Times of 5 minutes to 3 hours and preferably 10 minutes to 2 hours are required for the phosgenation while times of 3 minutes to 3 hours and preferably 5 minutes to 60 minutes are required for the polycondensation.

The chain terminators typically used in the synthesis of polycarbonates may be added before, during or after the phosgenation reaction.

The other branching agents, if any, are added together with the diphenols at the beginning of the reaction.

Suitable organic solvents for the interfacial process are chlorinated hydrocarbons immiscible with water, such as methylene chloride, chloroform and 1,2-dichloroethane, and also chlorinated aromatic hydrocarbons, such as chlorobenzene, dichlorobenzene and chlorotoluene or mixtures of the solvents mentioned.

Solutions of $Li(OH)_2$, NaOH, KOH, $Ca(OH)_2$ and/or $Ba(OH_2)$ in water are suitable for use as the aqueous alkaline phase.

Suitable tertiary aliphatic amines are those containing 3 to 15 carbon atoms, i.e. for example trimethylamine, triethylamine, n-tripropylamine and n-tributylamine, N-ethyl piperidine.

The resulting solutions of the polyester carbonates according to the invention in the organic solvents are worked up in the same way as the solutions of thermoplastic polycarbonates produced by the interfacial process; at the same time, the polyester carbonates according to the invention are also aftertreated by being a) isolated by known methods, for example by precipitation with methanol or ethanol and subsequently dried and heated or exposed to shear forces or dissolved in organic solvents, allowed to gel or b) exposed to shear forces during isolation, for example in an evaporation extruder, or c) allowed to gel before isolation in the solvent used in the production of the polyester carbonates by the interfacial process.

The polyester carbonates according to the invention may be isolated as follows:

a) By precipitation of the polyester carbonates from the organic phase with organic solvents, methanol, ethanol, isopropanol, acetone, aliphatic hydrocarbons and cycloaliphatic hydrocarbons, for example, being suitable for precipitation.

b) By isolation of the polyester carbonates in an evaporation extruder at temperatures of around 160° to 240° C. under the known conditions for the extrusion of polycarbonates involving the application of shear forces.

c) By partial distillation of the organic solvent to a certain concentration, a high-percentage (around 30 to 40% by weight) polymer solution being obtained; the polyester polycarbonate gels during the subsequent slow evaporation of the remaining solvent.

The gelation of the polyester carbonates—either without isolation in the worked-up organic phase of the two-phase reaction mixture or in a separate solution of the polyester carbonates isolated beforehand in organic solvents—is carried out by cooling the high-percentage polymer solution, times of 5 minutes to 12 hours at temperatures of 0° C. to 40° C.—depending on the polyester or polycarbonate component—being required for the gelation process.

The gelled product may be worked up to form a powder mixture, the polyester polycarbonate obtained being dried in vacuo for 48 hours at 50° C. and for 24 hours at 100° C.

Suitable solvents for the separate gelation of the isolated polyester polycarbonates are methylene chloride, benzene, toluene, xylene, chlorobenzene and other organic solvents.

The isolated polyester polycarbonates are heated for 5 minutes to 24 hours at temperatures of 40° C. to 170° C.

Shear forces of 0.2 to 0.7 kWh/kg polymer are applied to the isolated polyester carbonates for 5 to 30 minutes at temperatures of 130° to 250° C.

The reaction of the polyesters according to the invention, the diphenols and phosgene by the interfacial process is substantially quantitative so that the composition of the polyester polycarbonates can be determined through the choice of the reactant ratio.

The quantity of phosgene is determined by the phenolic components used, by the stirring intensity and by the reaction temperature which may be in the range from 0° C. to around 80° C.

The molar reactant ratio of phenolic OH and carboxyl groups to phosgene is generally between 2:1 and 2:1.5.

The production of the polyester polycarbonates according to the invention in homogeneous solution by the so-called pyridine process is carried out by dissolving the phenolic reactants and polyesters, optionally chain terminators and optionally other branching agents in organic solvents, for example in the solvents mentioned above for the interfacial process, adding an organic base and phosgenating the solution as a whole.

The reaction conditions correspond to those typically used for the production of thermoplastic polycarbonates. The solutions of the polyester polycarbonates according to the invention obtained are isolated and washed in the usual way.

The solutions are then worked up in the same way as described above for the solutions of the polyester polycarbonates according to the invention obtained by the interfacial process.

The same applies to the aftertreatment of the polyester polycarbonates thus produced.

The reaction is also substantially quantitative in the pyridine process.

The polyester polycarbonates according to the invention can also be produced by transesterification of the polyesters according to the invention with diaryl carbonates and with the diphenols mentioned.

This transesterification process may also be modified by carrying out the transesterification with polycarbonates of the diphenols mentioned rather than with diaryl carbonates and the diphenols mentioned, for example in an extruder.

In this case, mixtures of the polyester polycarbonates with the polycarbonates of the diphenols mentioned are formed in addition to the polyester polycarbonates according to the invention.

The polyester carbonates according to the invention have average molecular weights $\overline{M}_w$ (weight average) in the range from 5,000 to 300,000 and preferably in the range from 35,000 to 100,000, as determined by the light scattering method using a scattered light photometer.

Their relative solution viscosity $\eta_{rel}$ (as measured on 0.5 g in 100 ml of methylene chloride at 25° C.) should be between 1.05 and 3.4 and is preferably between 1.2 and 2.3.

The UV stability and the hydrolysis stability of the polyester carbonates according to the invention can be improved by UV stabilizers, such as for example substituted benzophenones or benztriazoles, in typical quantities for thermoplastic polycarbonates, by hydrolysis stabilizers., such as for example monocarbodiimides and above all polycarbodiimides (cf. W. Neumann, J. Peter, H. Holtschmidt and W. Kallert, Proceedings of the 4th Rubber Technology Conference, London, 22nd to 25th May, 1962, pages 738 to 751), in quantities of 0.2 to 5% by weight, based on polyester polycarbonate and by antiagers well-known in the chemistry of thermoplastic polyesters and thermoplastic polycarbonates.

The products according to the invention may be modified by addition of such substances as, for example, carbon black, kieselguhr, kaolin, clays, $CaF_2$, $CaCO_3$, aluminium oxides and typical glass fibers in quantities of 2 to 40% by weight, based on the total weight, and inorganic pigments both as fillers and as nucleating agents.

If flame-retardant products are required, around 5 to 15% by weight, based on polyester carbonate, of flame-proofing agents well known in the chemistry of thermoplastic polyesters and thermoplastic polycarbonates, such as for example antimony trioxide, tetrabromophthalic anhydride, hexabromocyclododecane, tetrachloro- or tetrabromobisphenol or tris-(2,3-dichloropropyl)-phosphate, may be added, tetrachloro- and tetrabromobisphenols statistically incorporated in the polycarbonate blocks of the polyester carbonates also promoting flame-retardant properties.

Processing aids well known in the chemistry of thermoplastic polyesters and thermoplastic polycarbonates, such as mold release agents, may also be effectively used.

The polyester carbonates obtained by the process according to the invention may be used with advantage for any applications requiring a combination of hardness (through the polycarbonate segment) and elasticity (through the aliphatic segment), more particularly flexibility at low temperatures, as for example in bodywork construction, for the production of low-pressure tires for motor vehicles, for coverings of hoses, sheets, tubes and for flexible drive disks and in medicine.

In addition, the polyester carbonates according to the invention containing 30 to 60% of predominantly aliphatic polyester blocks may be mixed with pure aromatic polycarbonates of the above-mentioned diphenols by compounding. Quantities of 1 to 20% by weight of the polyester block according to the invention in the compound as a whole are preferred.

As already mentioned, blends such as these may also be obtained by transesterification of the polyesters according to the invention with polycarbonates of the diphenols mentioned.

In addition, the polyester carbonates according to the invention may also be blended in known manner with other thermoplastics.

Suitable blend partners are thermoplastic polyesters of the type described in Houben-Weyl, Vol. E20/Part 2, 4th Edition, 1987, Georg Thieme Verlag, pages 1411–1413 and 1418–1422, preferably polyethylene terephthalate and polybutylene terephthalate.

Other blend partners are thermoplastic polyolefins of the type described, for example, in Houben-Weyl, Vol. E20/Part 2, 4th Edition, 1987, Georg Thieme Verlag, pages 689–1255, preferably polyethylene, polypropylene, polystyrene or copolymers of ethylene, propylene with maleic anhydride, acrylates or glycidyl methacrylate.

Other blend partners are thermoplastic polysulfones of the type described in Houben-Weyl, Vol. E20/Part 2, 4th Edition, 1987, Georg Thieme Verlag, pages 1467–1482.

The ratio of blend partner to block copolycarbonate is 5:95 to 95:5 and preferably 20:80 to 80:20.

Accordingly, the present invention also relates to blends of the polyester polycarbonates according to the invention with a blend partner selected from thermoplastic polyesters, thermoplastic polyolefins and thermoplastic polysulfones, the ratio by weight of blend partner to polyester polycarbonate being 5:95 to 95:5 and preferably 20:80 to 80:20.

The polyester carbonates according to the invention are distinguished by very high fuel resistance and by high transparency.

EXAMPLES

Example 1 (Production of an acid-terminated polyester)

0.84 Mole of dimer fatty diol (36 carbon atoms) is mixed with 1.2381 mole of dimer fatty acid (36 carbon atoms) and the resulting mixture is heated for 16 hours to 190° C., 0.155 mole of water distilling off. The acid value is 48 which gives a molecular weight Mn of 2340 g/mole.

Example 2

(Production of a polyester carbonate)

A mixture of 8 kg of 45% NaOH, 40 kg of water, 4.56 kg of bisphenol A, 90 g of p-tert.butylphenol, 565 g of the polyester of Example 1, 13.2 kg of chlorobenzene and 35.2 kg of methylene chloride is phosgenated with 2.7 kg of phosgene and, after stirring for 1 hour, 28 ml of N-ethyl piperidine are added and the mixture is left to react for 1 hour. The organic phase is separated off and concentrated by evaporation in an evaporation extruder.

A substantially transparent polyester carbonate with a glass temperature of 145° C. and a relative viscosity (0.5% solution in $CH_2Cl_2$, 25° C.) of 1.28 is obtained.

Fuel resistance:

If a bar (80×10×4 mm) of this polyester carbonate is exposed for 30 seconds to a 1:1 mixture of isooctane and toluene under an outer fiber strain of 0.6%, it shows an impact strength of "unbroken".

A polycarbonate of bisphenol A with a relative viscosity of 1.28 breaks under this treatment.

We claim:

1. Acid-terminated polyesters with an acid value of 2 to 70 and an OH value of <10, the maximum OH value being 30% of the acid value, obtained from
   A) hydrogenated dimer fatty acids containing 36 or 44 carbon atoms and
   B) dimer fatty diols containing 36 or 44 carbon atoms.

2. Acid-terminated polyesters as claimed in claim 1 corresponding to general formula (I):

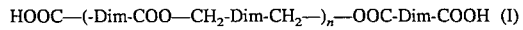

HOOC—(-Dim-COO—$CH_2$-Dim-$CH_2$—)$_n$—OOC-Dim-COOH  (I)

in which n is a natural number of 1 to 50 and

Dim corresponds to formula (II) and/or (III) and/or (IV):

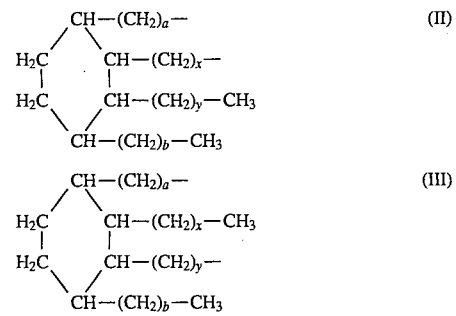

with a+b=12 and x+y=14, and

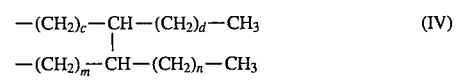

with c+d=19 and m+n=19.

3. A polyester carbonate produced from the acid-terminated polyester of claim 1.

4. A polyester carbonate of claim 3, which contains diphenol and phosgene units, and contains 1 to 70% by weight acid-terminated polyester, based on diphenol units.

5. A molded article produced from the polyester carbonate of claim 3.

6. Polyester carbonates as claimed in claim 4 containing 5 to 20% by weight of polyester units.

7. Mixtures of the polyester carbonates claimed in claim 4 with a blend partner selected from thermoplastic polyesters, thermoplastic polyolefins and thermoplastic polysulfones.

* * * * *